Figure 7:
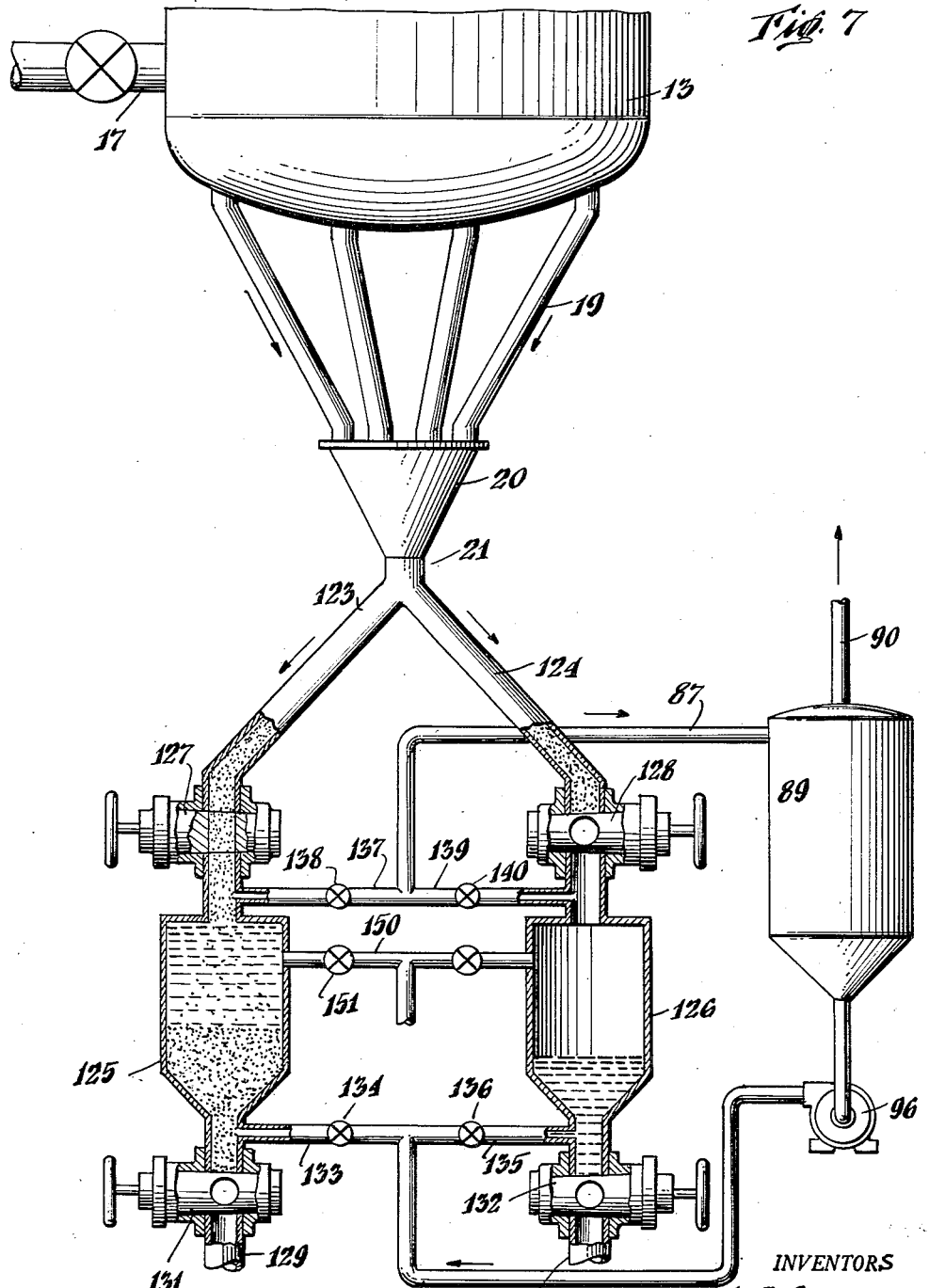

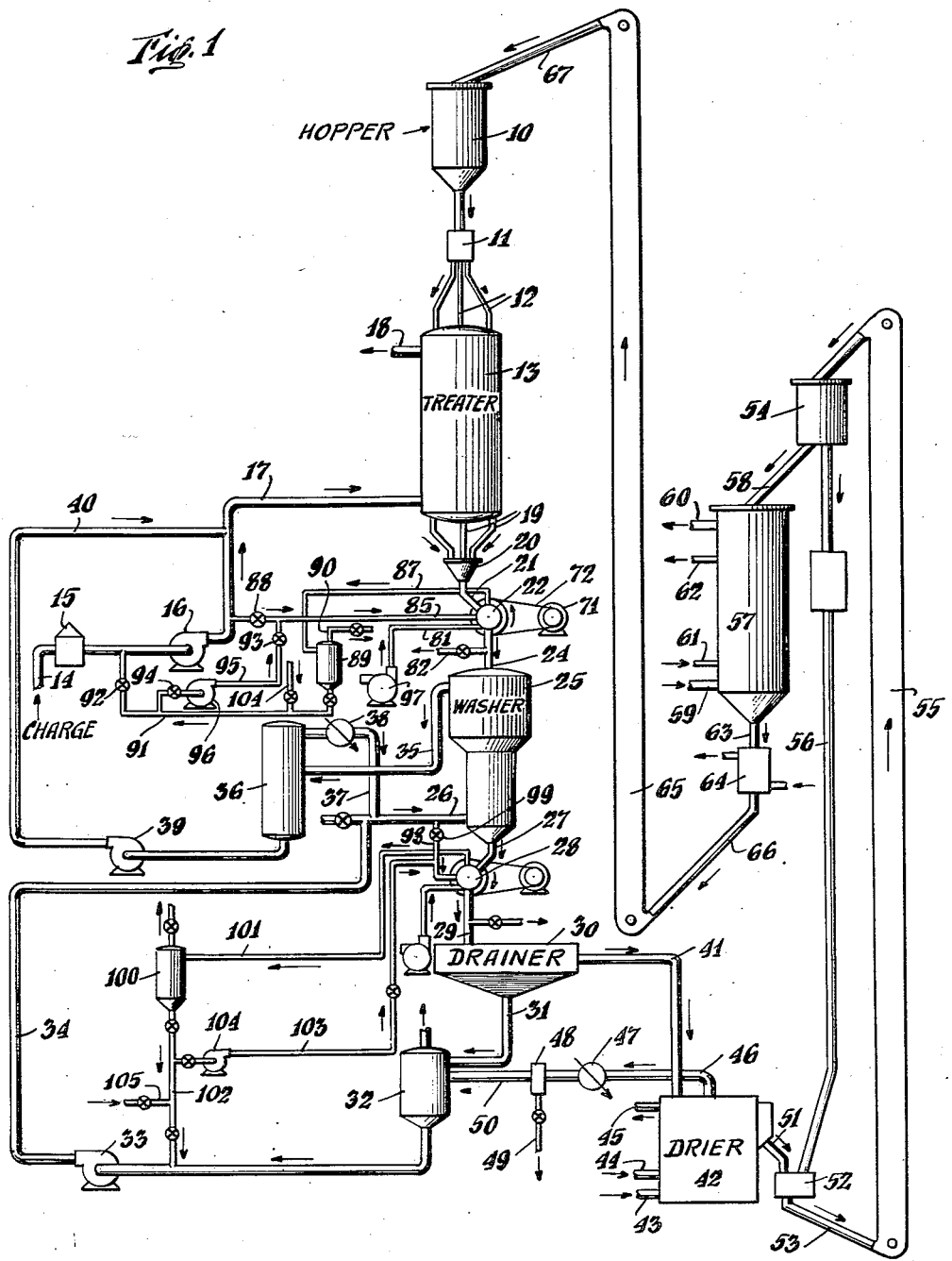

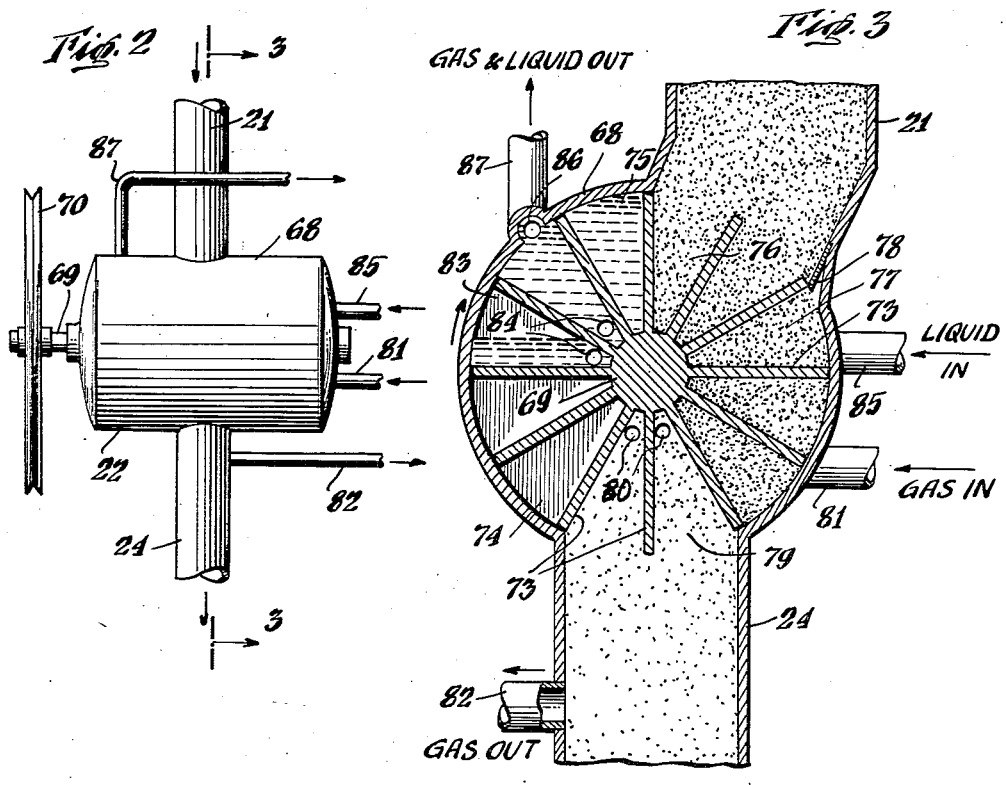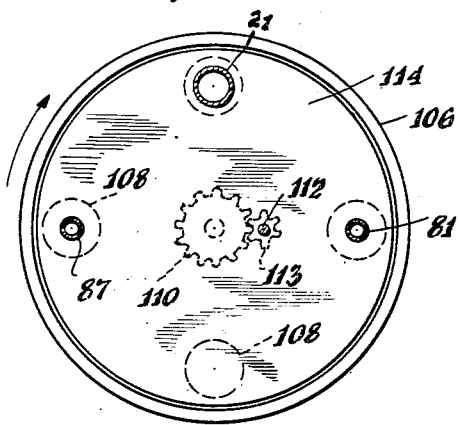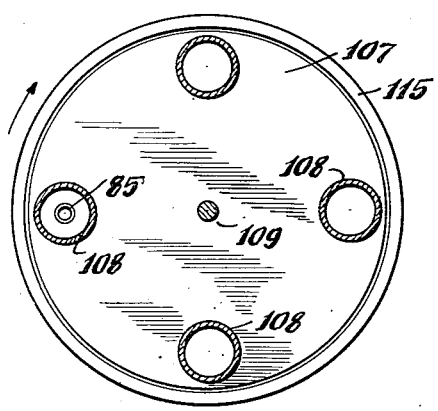

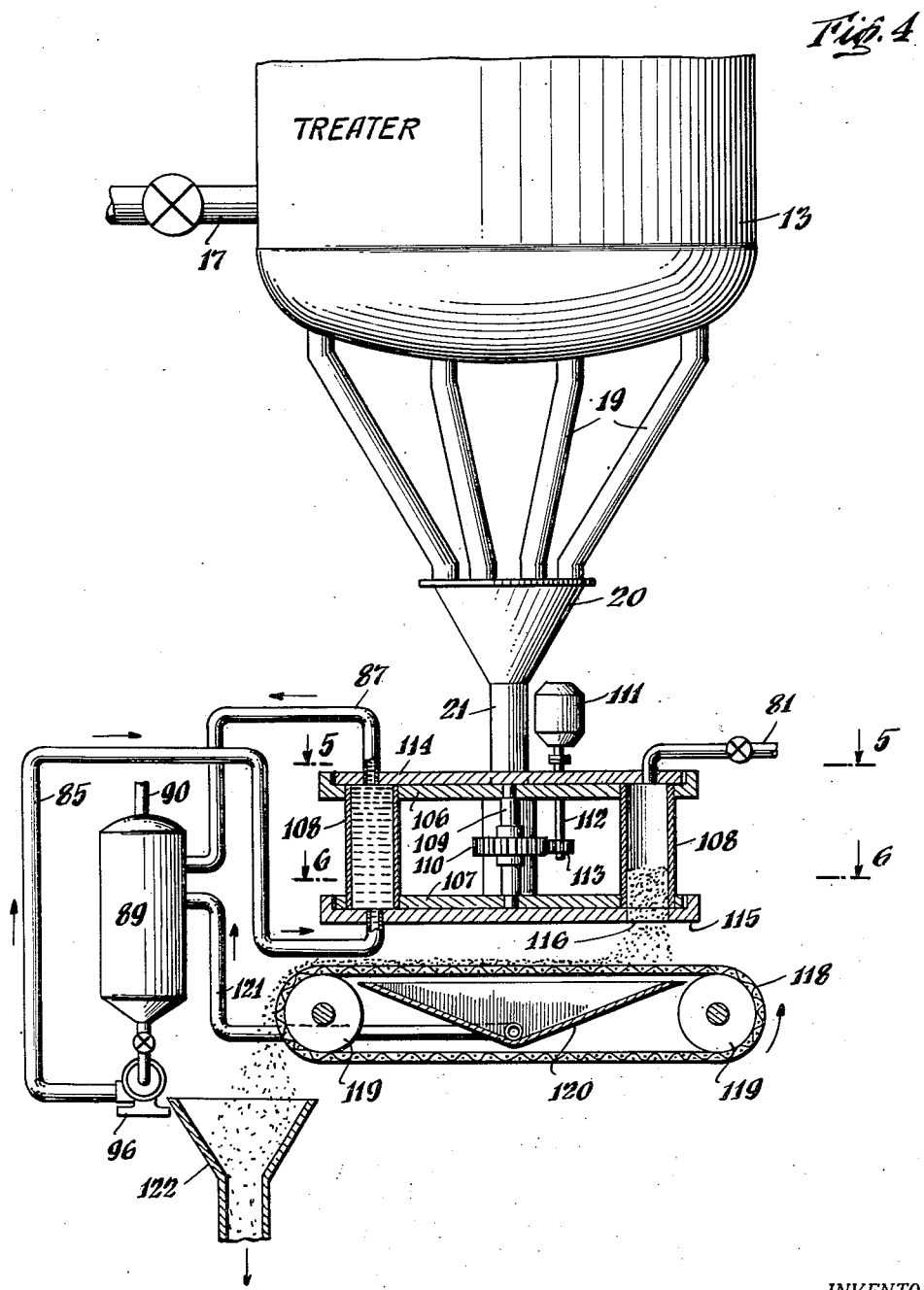

INVENTORS
Joseph I. Savoca
Howard W. Shea
BY
Andrew L. Jabouriault
AGENT

United States Patent Office 2,794,772
Patented June 4, 1957

2,794,772

METHOD AND APPARATUS FOR THE REMOVAL OF GRANULAR SOLIDS FROM A COLUMNAR MASS THEREOF

Joseph I. Savoca, Woodstown, and Howard W. Shea, Mount Royal, N. J., assignors to Socony Mobil Oil Company, Inc., a corporation of New York Application March 16, 1953, Serial No. 342,492

9 Claims. (Cl. 196—147)

This invention has to do with a method and apparatus for the removal of granular solids from a columnar mass of the solids maintained within a closed vessel, and is particularly concerned with the removal of said solids at controlled rates in a manner which avoids disruption of the columnar mass.

Typical of the processes to which this invention applies is the continuous percolation of a liquid hydrocarbon stream through a downwardly moving columnar mass of granular adsorbent solids, such as fuller's earth, for the purpose of decolorizing the liquid and removing small amounts of undesirable impurities therefrom. Another typical process to which this invention may be applied is the treatment of water by granular zeolites.

In processes of the above-mentioned types, as well as numerous others, it is necessary that the granular solids be removed from the columnar mass at a controlled rate, so that the ratio of solids to liquid may be maintained at some single desired value. In addition, it is necessary that this removal be effected without disruption of the columnar mass of solids which may lead to non-uniform contacting of liquid and solids. The granular solids which are to be removed in such systems exist admixed with a portion of the liquid supplied to the contacting zone. Attempts to control the rate of withdrawal by means depending on a change in area of a restriction, such as with ordinary valves or orifices, have not been successful, since the liquid oil composition of the stream being withdrawn changes with the area of the restriction and renders control by this means erratic and unreliable.

A major object of this invention is to provide a method and apparatus for removing granular solids from an enclosed contacting zone or chamber which overcomes the above-described difficulties.

Another object of this invention is to provide a method and apparatus for removing granular solids from a confined contacting zone within an enclosed vessel at controlled rates.

Another object of this invention is to provide a method and apparatus for the removal of granular solids from a columnar mass thereof in a manner which avoids disruption of the mass.

Another object of this invention is to provide a method and apparatus for the controlled removal of a granular adsorbent from the contacting zone of a liquid hydrocarbon purification process.

These and other objects of the invention will become apparent from the following discussion. Particularly, this invention provides a method and apparatus for removing granular solids from the contacting zone or chamber of a process for the countercurrent contacting of liquid with granular solids. A confined drain column of liquid is maintained below the contacting zone. Granular solids from the contacting zone are passed into the upper section of this column and allowed to settle through the column. The lower end of the liquid column is periodically opened to a confined withdrawal or removal compartment or zone which is substantially filled with a suitable flush liquid. Granular solids from the liquid column settle into the withdrawal zone without any substantial net flow of liquid downwardly through the drain column. The withdrawal zone is then closed off from the liquid column in a manner such as to prevent substantial escape of liquid from the column. Granular solids are then discharged from the compartment downwardly and then the compartment, filled with flush liquid, is again placed in communication with the lower end of the liquid column.

This invention will be best understood by referring to the attached drawings, of which Figure 1 is an elevational view of a continuous mineral oil percolation process utilizing this invention, Figure 2 is an elevational view of a preferred form of apparatus of this invention, Figure 3 is a sectional view along line 3—3 of Figure 2, Figure 4 is an elevational view, partially in section, of a less preferred form of this invention, Figure 5 is a plan view, partially in section, along line 5—5 of Figure 4, Figure 6 is a sectional view along line 6—6 of Figure 4, and Figure 7 is an elevational view, partially in section, of another form of this invention.

All of these drawings are diagrammatic in form and like parts in all bear like numerals.

The granular solids used in this invention should be of palpable particulate form, having substantial size, as distinguished from finely divided powders. The term "granular" is used herein to refer to solids of this form. The granular solids may take the form of pellets, capsules, pills, spheres, or the like, or particles of irregular shape, such as are obtained from grinding and screening operations. Granular solids generally should be within the range about 4 to 100 mesh, and preferably 10 to 60, and still more preferably 15 to 30 mesh by Tyler standard screen analysis.

Turning now to Figure 1, there is shown there a typical percolation process for the purification of liquid mineral oils by means of a granular solid adsorbent. This process is of the type described and claimed in U. S. patent application, Serial No. 177,408, filed August 3, 1950, now Patent No. 2,701,786. A suitable supply of a granular adsorbent is maintained within supply hopper 10. The adsorbent for use in the percolation process here described preferably should have a pore structure such that more than thirty percent of the pore volume, and preferably more than sixty percent of the pore volume, is occupied by macro pores (that is, pores having radii greater than 100 Angstrom units). Typical adsorbents which may be employed are fuller's earth, bauxite, bentonite and bone char, charcoal, magnesium silicate, heat and acid-activated kaolin, and activated carbon. Synthetic silica or alumina or silica-alumina gel adsorbents and the like may be employed, but preferably the preparation should be controlled to provide a pore structure of the aforementioned type. It should be understood, however, that synthetic adsorbents having less than thirty percent macro pores may be employed in the process of this invention, although with somewhat inferior results when used for lubricating oil purification. Typical of the purposes for which the liquid charge oil may be treated are decolorization, neutralization, removal of suspended, colloidal or dissolved impurities, such as carbon or coke or oxygen and nitrogen-containing impurities and other gum-forming compounds, and improvement of the demulsibility properties of the oil.

The adsorbent gravitates from hopper 10 into a distributor 11 of the type described and claimed in U. S. patent application, Serial No. 237,264, filed July 17, 1951, now Patent No. 2,745,795. Adsorbent solids gravitate from the lower section of the distributor as a plurality of streams passing through passages 12 into the upper section of treater 13. The adsorbent passes through the contacting zone within the treater as a columnar mass. Liquid hydrocarbon charge, such as mineral oil or fuel oil of low asphalt content, enters the system through passage 14 and is heated to the desired treating temperature in heater 15. The treating temperature generally may be within the range 0–700° F., but generally should be below the flash point of the oil. In a typical mineral oil decolorization operation, the treating temperature might be 300° F. This charge is pumped by means of pump 16 through passage 17 into the lower end of the treating zone within treater 13. The liquid charge passes upwardly through the columnar mass of adsorbent solid within the contacting zone and is purified thereby. The liquid product is removed through passage 18. Adsorbent is removed from the lower section of the contacting zone and passes downwardly through passages 19 into a collector 20. The adsorbent passes from the collector through passage 21 and is removed therefrom at controlled rates by withdrawal device 22 constructed according to this invention and described hereinbelow. A continuous column of liquid charge exists between the columnar mass in the contacting zone and withdrawal device 22, and the adsorbent drops through this column, in effect creating a column of liquid charge and adsorbent slurry between these points. By controlling the rate of withdrawal of adsorbent through passage 21, by means of device 22, the rate of withdrawal of adsorbent from the contacting zone also is controlled. The adsorbent then passes through conduit 24 into the upper end of washer 25 and gravitates downwardly therethrough as a columnar mass. This washer may be of any of the types well known in the art, for example, that described and claimed in U. S. patent application, Serial No. 321,372, filed November 19, 1952. A suitable washing solvent is supplied to the lower section of the washer through passage 26 and passes upwardly therethrough so as to remove adhering oil from the downwardly moving adsorbent. Typical solvents which may be employed in the washing step include carbon tetrachloride, normal heptane, normal octane, petroleum naphtha boiling within the range 100° F. to 400° F. and carbon disulfide. A preferred solvent is a paraffinic naphtha boiling within the range of about 210–300° F. The washing step may be conducted at atmospheric pressure or at a pressure either above or below atmospheric and at any temperature below which substantial vaporization of the solvent occurs, for example, 60–250° F. The washed adsorbent is removed through passage 27 at a rate controlled by withdrawal device 28, similar to device 22. The adsorbent then passes through passage 29 into a drainer 30. In the drainer, solvent adhering to the adsorbent is drained therefrom and removed through passage 31 to accumulator 32. Solvent may then be pumped by means of pump 33 from the bottom of the accumulator and passed through passage 34 back into washer 25.

The used solvent, with dissolved oil, is removed from the upper section of washer 25 through passage 35. This used solvent is supplied to a fractionator 36 wherein solvent and oil are separated. Solvent passes overhead through passage 37 and is condensed by condenser 38 and returned to washer 25. Liquid oil is pumped from the lower end of fractionator 36 by means of pump 39 and returned to treater 13 through passages 40 and 17.

The drained adsorbent passes from drainer 30 through passage 41 into the upper section of drier 42. This drier may be, for example, of the type described and claimed in U. S. patent application, Serial No. 277,983, filed March 22, 1952. The adsorbent is maintained as a boiling bed within the drier by means of a suitable inert gas, such as steam or flue gas, admitted through passage 43. Heat is supplied to this bed by means of heat transfer tubes located therein which are supplied with a suitable heat transfer fluid through passage 44. This fluid is removed through passage 45. Stripping gas, after passage through the boiling bed, is removed, together with any solvent vaporized from the adsorbent, through passage 46. The solvent and the stripping gas, if condensible, are liquefied by condenser 47 and passed into separator 48. Condensed stripping gas is removed from the separator through passage 49 while the condensed solvent is passed into accumulator 32 through passage 50.

The dried adsorbent is removed from the drier 42 through passage 51 and passed into a combining box 52. Dried adsorbent is removed from the lower section of this box through passage 53 and elevated to a surge hopper 54 by means of an elevating means 55. This elevating means may be, for example, a bucket elevator or gas lift. A small part of the adsorbent from surge hopper 54 is returned to combining box 52 through passage 56 so as to insure that passage 53 will never be empty of adsorbent, thereby allowing vapors to escape from drier 42. This development is described and claimed in U. S. patent application, Serial No. 278,059, filed March 22, 1952. The major portion of the adsorbent from surge hopper 54 passes into the upper section of regenerator 57 through passage 58. The adsorbent passes through the regenerator as a substantially compact bed. A suitable combustion supporting gas, such as air, is admitted to this bed through passage 59 and passes upwardly therethrough. This gas acts to burn off impurities that have been deposited on the adsorbent in the contacting zone. These impurities may consist of carbonaceous materials and color bodies and the like. Flue gas is removed through passage 60. The bed within regenerator 57 is controlled to a temperature below the heat damaging temperature of the adsorbent by means of cooling coils maintained within vessel 57. These coils are supplied with a suitable cooling fluid through passage 61 while cooling fluid is removed through passage 62. The regenerated adsorbent is removed from the lower section of regenerator 57 through passage 63 and passed through cooler 64, wherein the temperature of the adsorbent is adjusted to the temperature desired for treating the liquid charge within vessel 13. The adsorbent is then passed into the lower end of elevating means 65 through passage 66. Adsorbent is elevated by means 65 to a level above hopper 10 and then gravitated into the upper section of the hopper through passage 67.

Details of a preferred form of apparatus of this invention are shown in Figures 2 and 3, which will be considered in connection with Figure 1. While the device described will be the withdrawal device 22 of Figure 1, the description is equally applicable to withdrawal device 28. Device 22 consists of a cylindrical casing or housing 68, closed on both ends, with the principal axis in a substantially horizontal plane. A shaft 69 extends centrally and horizontally through the length of the casing. A belt wheel 70 is attached to one end of shaft 69 outside of housing 68. This wheel may be attached to a motor 71, as shown in Figure 1, by means of a suitable belt 72, so that by operation of the motor, shaft 69 may be continuously revolved. Extending outwardly from shaft 69 to points adjacent the inner wall of housing 68, are radial vanes 73. These vanes extend the entire length of housing 68, so that a plurality of radially extending receptacles or compartments 74 are formed thereby. The inlet passage 21 to the casing 68 extends into the upper side thereof, while the outlet passage 24 extends downwardly from the bottom of the casing.

In operation, shaft 69, and therefore, compartments 74, are continuously rotated. The rate of granular solids withdrawal through passage 21 is controlled by the rate of rotation of these compartments, so that adjustments in withdrawal rate are made by adjusting the speed of rotation of shaft 69. Considering a compartment 74 at position 75, just before it is opened to withdrawal passage 21, the compartment at this point is filled with a suitable flush liquid. This liquid may be any liquid compatible with the process in which the device is being used. For example, in the continuous percolation process shown in Figure 1, when the device is used below treater 13, the liquid might be a portion of the liquid charge oil or it might be the naphtha wash solvent. Using water as a flush liquid would not be desirable for this process, because water tends to decrease the efficiency of the adsorbent rapidly within a short period of time. Water is also undesirable because it forms a putty-like mixture with the oil adsorbent slurry which will not flow under any conditions. On the other hand, water would be desirable for a zeolite water treating process. As the compartment rotates beyond position 75 to a position like 76, wherein it is open to communication with the lower end of passage 21, it acts as a withdrawal or receiving zone or compartment for granular solids from passage 21. The solids drop into the liquid-filled compartment. Depending upon the degree to which the compartment has been filled with liquid, there may be no net flow of liquid upwardly or downwardly through the slurry column maintained in passage 21, or a slight net up-flow or a slight net down-flow of liquid may be realized. In any case, however, the compartment, before being opened to the slurry column, should be substantially entirely filled with liquid, so that there will be no substantial flow in either direction. If there were a substantial downward flow, for example, it would mean that gas would be displaced from the compartment, which would bubble up through the slurry column and through the columnar mass thereabove to disrupt operations in the contacting zone. As revolution is continued, the compartment or withdrawal zone will reach a position 77, wherein it is closed off from communication with the slurry column in passage 21. A flexible scraper 78 is provided near the lower end of passage 21 to remove adhering granular solids from the ends of vanes 73 as they pass by to avoid their being crushed between the end of the vane and casing 68. Continued revolution brings the withdrawal zone to position 79, wherein it is open to discharge passage 24. Granular solids and flush liquid drop out of the withdrawal zone into passage 24 to assist in removal of the solids and liquid from the zone. A fluid, such as an inert gas like flue gas, or a liquid, may be admitted through ports 80 at a slight pressure. The fluid may be supplied to these ports through passage 81 and may be removed, when a gas, through vent passage 82. Continued revolution, after this point, brings any given withdrawal zone to position 83, wherein it is again filled with flush liquid admitted through passages 84. These passages are supplied with liquid through passage 85. The gas which this liquid forces out of the withdrawal zone is removed through port 86 into conduit 87. Where the withdrawal zone is completely filled with liquid, some liquid will also be removed through port 86 and passage 87.

This device enables the granular solids to be removed from the granular solids-liquid slurry in passage 21 at any desired rate without the use of a throttling device with its erratic and unreliable operation in this type of system. In addition, it avoids any substantial liquid withdrawal along which the granular solids, and also avoids the admission of gas to the slurry column, wherein the gas bubbles would disrupt the column and disrupt operations in the contacting zone thereabove. The flush liquid should not be one that is immiscible with the liquid in the slurry column in passage 21; otherwise an interface would be formed at the point where the granular solids enter the withdrawal zone which might be difficult for the solids to penetrate. In addition, if the immiscible flush liquid were lighter than the liquid in the slurry column, it would bubble up through the column with the same undesirable effect that gas bubbles have.

Possible systems for supplying flush liquid to the withdrawal device of this invention are illustrated at Figure 1. Considering withdrawal device 22, it is possible, in the arrangement shown, to use a portion of the mineral oil charge as a flush oil. This is accomplished by providing flush oil supply conduit 85 as a branch conduit from mineral oil supply line 17 on the downstream side of pump 16, the rate of supply of oil to device 22 being controlled by valve 88. The effluent oil and gas are then passed from the withdrawal device 22 through passage 87 into an accumulator 89. The gas passes from the accumulator through passage 90. Mineral oil is withdrawn from the accumulator through line 91 which connects into line 17 on the upstream side of pump 16. Alternatively, a separate flush liquid may be used. When this is done, valves 88 and 92 are closed, while valves 93 and 94 in by-pass line 95 are opened. The accumulator 89 is then filled with the desired liquid which is pumped therefrom by pump 96, so that the liquid follows a path of passage through conduit 91 into passageway 95, then into passageway 85 to withdrawal device 22, the liquid being returned to the accumulator through passageway 87 as before. The gas may be supplied to the withdrawal device 22 through passage 81 at a rate and pressure controlled by blower 97.

A similar system for the supply of flush liquid to withdrawal device 28 at the lower end of washer 25 may be provided. Flush liquid may be a portion of the naphtha supplied to the withdrawal device through line 98 at a rate controlled by valve 99. Effluent gas and liquid may be passed to an accumulator 100 through passage 101 and then supplied to the solvent return conduit 34 on the upstream side of pump 33 through 102. Alternatively, a separate liquid may be used through the use of by-pass line 103 with pump 104 in the same manner as described in connection with withdrawal device 22. If a separate flush liquid is used with either of these withdrawal devices, the system may be replenished with this liquid through passages 104 and 105, respectively.

A modified form of this invention is illustrated in Figures 4, 5, and 6, which are best considered together. Shown there are circular plates 106 and 107. Four substantially vertical cylinders 108 are fixed to these plates, with upper ends in plate 106 and lower ends in plate 107. A vertical shaft 109 is provided on the center line of the plates 106 and 107 and is equipped with spur gear 110. Motor 111 has shaft 112 extending therefrom with spur gear 113 thereon in engagement with spur gear 110. Cylinders 108 are equidistant from the center line of shaft 109. A roof plate 114 is provided on top of the cylinders and a base plate 115 therebelow. Conduit 21 connects into roof plate 114 in a position on the roof plate, which is the same distance horizontally from the center line of shaft 109 as cylinders 108. Thus, by revolving cylinders 108 about shaft 109, they will successively pass beneath the lower end of conduit 21. At a position in advance of conduit 21, in the direction of a rotation, an opening 116 is provided within base plate 115, so that when a cylinder 108 reaches this position, liquid and granular solids will discharge therefrom. At a position in advance of opening 116, but before conduit 21, in the direction of rotation, flush liquid supply conduit 85 connects into base plate 115 and gas and liquid withdrawal conduit 87 extends from roof plate 114.

In operation, a drain column of liquid-granular solids slurry extends from the lower section of the contacting zone within treater 13 downwardly through passages 19, collector 20 and conduit 21. Cylinders 108, which act as withdrawal zones or compartments, are continuously rotated about shaft 109 by means of motor 111. Considering first the cylinder, which is at a position so that its lower end is open to passage 85, this cylinder is filled with flush liquid from accumulator 89 by pumping the liquid through passage 85 by means of pump 96. The gas forced from this cylinder, together with some liquid, if desired, is passed through passage 87 back to accumulator 89, the gas leaving the system through passage 90. The cylinder filled with flush liquid then rotates to a position beneath the lower end of conduit 21. Granular solids from the slurry column therein drop into the chamber without any substantial net downward flow of liquid through the column. Rotation is continued until the cylinder coincides with opening 116, at which point liquid and granular solids drop therefrom onto a continuous belt screen 118. Gas may be introduced to the cylinder while in this position through passage 81 to assist in emptying the cylinder. Screen 118 is rotated around drums 119. Flush liquid drops from the granular solids into collector 120, from which it passes by means of pipe 121 back to accumulator 89. The granular solids pass over the screen and are discharged into funnel-shaped member 122 which may connect on its lower end to the upper end of the washer or other receiving vessel. Continued rotation of the cylinder brings it back to a position where it may again be filled with flush liquid. The rate of withdrawal of the granular solids from the slurry column within passage 21 is controlled by controlling the rate of revolution of cylinders 108. If desired, as few as three cylinders may be used or more than four may be used. It may also be more desirable, in some applications, rather than rotating cylinders 108 at uniform speed, to have them move rapidly from one position to the next and then remain at each position a fixed period of time.

Still another modification of this invention is illustrated in Figure 7. There, conduit 21, extending from collector 20, splits into two branches 123 and 124. Each branch connects into a separate withdrawal chamber, chambers 125 and 126, respectively. A full opening plug cock valve 127 is provided near the lower end of branch 123, while plug cock valve 128 is provided near the lower end of branch 124. Conduits 129 and 130 extend from the lower ends of chambers 125 and 126, respectively, and have plug cock valves 131 and 132, respectively, thereon. Extending from flush liquid accumulator 89 is flush liquid supply conduit 85 with pump 96 thereon. Conduit 85 splits into two branches, 133 with valve 134 thereon, and 135 with valve 136 thereon. Conduit 133 connects into conduit 129 at a position above plug cock valve 131, while conduit 135 connects into conduit 130 or chamber 126 at a position above plug cock valve 132. Extending from conduit 123, at a position between plug cock valve 127 and chamber 125, is conduit 137 with valve 138 thereon. Extending from conduit 124, at a position between plug cock valve 128 and chamber 126, is conduit 139 with valve 140 thereon. Conduits 137 and 139 join to form a single conduit 87 which connects into accumulator 89.

In operation, granular solids from the slurry column are supplied alternately to the withdrawal zones defined by chambers 125 and 126. Considering a cycle as starting when chamber 126 is empty, valves 128, 132, and 131 will be closed, while valve 127 is opened to admit granular solids to chamber 125 from the slurry column thereabove in conduit 123. Chamber 126 is first filled with flush liquid by opening valve 136 while maintaining valve 134 closed. Valve 140 is also opened so that gas and a portion of the flush liquid may be returned to the accumulator through passages 139 and 87. When chamber 126 is filled with flush liquid, plug cock valve 128 is opened while plug cock valve 127 is closed. Plug cock valve 131 is then opened to allow granular solids and flush liquid to discharge from chamber 125. At this point, if desired, an inert gas may be admitted through passage 150 by opening valve 151 to assist in emptying the chamber of solids and oil in the manner described above.

When chamber 125 is empty, valve 131 is closed and chamber 125 filled with flush liquid through passage 133. Chamber 125 may then be reopened to the slurry column by opening valve 127 while chamber 126 can be closed off by closing valve 128. The rate of withdrawal of granular solids from the treater 13 is controlled by controlling the operation of the plug valves on a cycle suitable to give the desired rate. While valves are used in this modification, they are used in such a manner that they are either fully opened or fully closed. No attempt is made to control the rate of granular solids removal by the operation of the valve as a throttle.

It is apparent that the method and apparatus of this invention provides for the withdrawal of granular solids from a slurry column thereof at any desired rate. This invention is free from the erratic type of rate control which is characteristic of methods which control the granular solids withdrawal by varying a withdrawal opening in the outlet line, for example, as valves do. In addition, the withdrawal of the granular solids is accomplished without any substantial downward movement of liquid through the slurry column above the withdrawal device. The invention also avoids the introduction of gas bubbles into the slurry column which will disrupt the column and disrupt operations in the contacting zone from which the column extends.

An additional advantage of this invention is that it does not require that a back pressure or liquid seal be exerted on the contacting zone from which granular solids are being withdrawn. Thus, the discharge side of the withdrawal device can be at atmospheric pressure while the inlet side is considerably above atmospheric pressure. This advantage occurs because the withdrawal chambers, after they are filled with granular solids, are cut off from communication with the slurry column by a substantially liquid-tight closure so that there can be substantially no flow of liquid from the column into the chamber after communication is cut off. Thus, operations in the zone feeding to the withdrawal device and the zone receiving from the withdrawal device may be conducted independently of each other.

In order to provide a suitable closure against liquid in an apparatus designed similar to that shown in Figure 3, the distance between the vanes 73 and the casing 68 should be not greater than ten times the average particle diameter of the adsorbent used, and preferably not greater than five times this diameter. However, the vanes should be able to move freely along the casing as they rotate. It is preferable, in the apparatus of Figure 3, that sufficient vanes be used so that there will always be at least two vanes between the inlet conduit and the outlet conduit in the direction of rotation to insure a liquid-tight closure therebetween.

The operation of a withdrawal device, according to this invention, will be governed by the settling rate of wet, granular solids through the liquid column below the contacting zone. The settling rate may be determined from the following equation:

$$U = \frac{65{,}900 \; D^2 \left(\dfrac{S_a}{1-F}\right)\left(1-\dfrac{S_1}{S_t}\right)}{Z}$$

where $U$=settling velocity, feet per minute; $D$=average particle diameter of the granular solids, inches; $S_a$=apparent density of the granular solids, grams per cubic centimeter; $F$=fraction voids of the granular solids at apparent density $S_a$; $S_1$=density of liquid in drain column, grams per cubic centimeter; $S_t$=true density of the granular solids, grams per cubic centimeter; $Z$= viscosity of liquid in the drain column, centipoises.

The conduit 21 supplying the withdrawal device should have a cross-sectional area not greater than $$A = \frac{GZ}{15.5\left(\dfrac{S_a}{1-F}\right)\left(1-\dfrac{S_1}{S_t}\right)}$$

nor less than $$A = \frac{GZ}{15{,}300\left(\dfrac{S_a}{1-F}\right)\left(\dfrac{S_1}{S_t}\right)}$$

Preferably the area of this conduit should be $$A = \frac{GZ}{404\left(\dfrac{S_a}{1-F}\right)\left(1-\dfrac{S_1}{S_t}\right)}$$

where $A$ = cross-sectional area of the feed conduit, square feet; rate of removal of granular solids-liquid slurry desired, gallons per minute.

The rate of rotation of the cylinders or compartments of the withdrawal device is limited by the settling velocity and may be determined by the following equation:

$$RPM = \frac{65{,}900\, D^2 \left(\dfrac{S_a}{1-F}\right)\left(1 - \dfrac{S_1}{S_t}\right)}{ZNL}$$

where RPM = the maximum rate of rotation of the withdrawal compartments or zones; $N$ = the total number of compartments in the withdrawal device multiplied by the area of the upper or outer end of one compartment and divided by the area of the inlet conduit; $L$ = height of one compartment in feet. N should be generally not more than 12 nor less than 2. For a device of the type of Figure 3, N should preferably be about 6. L should be within the range about 0.05 to 5.0 feet. With a device of the type of Figure 3, the diameter of the device should be at least twice the width of the inlet conduit.

As an example of a suitable design of a withdrawal device according to this invention, consider a system for withdrawing a granular adsorbent from mineral oil purification process of the type of Figure 1. The properties of the oil and adsorbent are as follows:

Adsorbent used _____ 15–30 mesh fuller's earth.
Particle diameter of adsorbent _____ 0.030 inch.
Viscosity of oil _____ 5.0 centipoises.
Density of oil _____ 0.8 gram/cubic centimeter.
Apparent adsorbent density _____ 0.50 gram/cubic centimeter.
True adsorbent density _____ 2.5 gram/cubic centimeter.
Fraction of volume void at apparent density of 0.50 g./cc. _____ 0.48.
Maximum desired slurry withdrawal rate _____ 15 gallons per minute.

The withdrawal device was designed similar to the design shown in Figure 3. The area of the inlet conduit was 0.259 square feet. This could be a 7-inch circular pipe. The diameter of the withdrawal device was 14 inches. There were 12 withdrawal compartments used. The height of one compartment was 0.541 feet, the shaft 69 being of 3-inch diameter. The length of the cylindrical casing and of each compartment was 3.74.

It is intended to cover herein all changes and modifications of the examples of the invention herein chosen for purposes of disclosure which do not constitute departure from the spirit and scope of the invention.

We claim:

1. A method for removing granular solids at a controlled rate from the contacting zone of a process for counter-current contacting of a liquid with granular solids and discharging said solids into a conduit filled with gaseous atmosphere at the point of discharge, which comprises: maintaining a column of the liquid below the contacting zone; allowing granular solids to settle from the lower section of the contacting zone through said liquid column; providing a plurality of confined withdrawal compartments beneath said column; causing each of said withdrawal compartments to be operated on a cycle comprising, filling the compartment substantially entirely with a suitable flush liquid while out of communication with said column, then opening the compartment to said column to allow granular solids to settle into the compartment without any substantial net flow of liquid downwardly through the liquid column, closing off communication between the withdrawal compartment and the column and then discharging liquid and granular solids from the withdrawal compartment into a gaseous atmosphere so that gas enters the withdrawal compartment and refilling the compartment with flush liquid thereby driving out of said compartment at least a substantial part of said gas; controlling the cycles for all of said withdrawal compartments so that at least one withdrawal compartment is always in communication with said column; and controlling the rate of opening and closing communication between withdrawal compartments and said column to control the rate of granular solids removal from the column at the desired level.

2. A method for continuously removing granular solids from the contacting zone of a process for the counter-current contacting of liquids and granular solids, which comprises: maintaining a drain column of liquid and granular solids beneath said contacting zone, maintaining a plurality of confined withdrawal zones within a housing beneath said column, said zones extending radially outwardly from the center of said housing to the walls thereof, continuously rotating said zones about a horizontal axis, allowing granular solids to settle from said column into said zones in succession as they revolve, filling said zones substantially entirely with a suitable flush liquid before they are opened to communication with said column, thereby forcing gas from said zones so that when there is communication between said column and each of said withdrawal zones there will be substantially no net down-flow of liquid through said column, closing off communication between said zones and said column after granular solids have settled into said zones and then discharging liquid and granular solids downwardly from said zones when they reach the lower part of said revolution, supplying an inert gas to said zones while discharging solids and liquid to effect efficient removal thereof, and controlling the rate of rotation of said zones so as to control the rate of removal of granular solids from said column and said contacting zone thereabove.

3. The method of claim 2 wherein the contacting process is a liquid mineral oil decolorization process and the granular solids are a granular adsorbent, while the liquid contacted is a liquid mineral oil.

4. A method for removing granular solids at a controlled rate from the lower section of the contacting zone of a process for contacting granular solids with a liquid and discharging said solids into a gaseous atmosphere, which comprises: passing granular solids and some liquid from the lower end of the contacting zone downwardly as a column of liquid-granular solids slurry; providing a plurality of confined withdrawal zones below said column; rotating said zones about a vertical axis, and causing each of said zones in succession to undergo a cycle of operations in which it is first filled substantially entirely with a suitable flush liquid while being maintained out of communication with said column so that gases are forced out of said zone, secondly opened to communication with said column so as to allow granular solids to settle from said column into said withdrawal zone without any net down-flow of liquid from said column, and thirdly closed off from communication with said column and finally emptied of liquids and granular solids into a gaseous atmosphere so that gas enters said zone; and controlling the rate of revolution of said zones so as to control the rate of removal of granular solids from said column and said contacting zone thereabove.

5. A method for removing granular solids at a controlled rate from the lower section of the contacting zone of a process for contacting granular solids with a liquid, which comprises: passing granular solids and liquid from the lower end of said contacting zone downwardly as a confined column of granular solids-liquid slurry, providing two separate confined withdrawal compartments below said column, alternately opening each of said compartments to said column so that granular solids will drop therefrom into the compartment, removing granular solids from said withdrawal compartment while it is out of communication with said column into a gaseous atmosphere so that gases enter said compartment and filling said compartment with a suitable flush liquid substantially entirely, whereby there will be substantially no net down-flow of liquid through said column into the withdrawal compartments, and controlling the rate of opening and closing said compartments to communication with said column to maintain the desired rate of removal of granular solids from said column and from said contacting zone thereabove.

6. The method of claim 1 further limited to the flush liquid being identical with the liquid charge to the contacting zone.

7. The method of claim 1 further limited to the contacting process being the decolorization of a liquid mineral oil by means of a granular solid adsorbent so that the granular solids are granular adsorbent and the liquid charge is a liquid mineral oil, and still further limited to the flush liquid being a liquid wash naphtha suitable for removing liquid oil from the adsorbent.

8. A process for removal of granular solids at controlled rates from a contacting zone of a process for the contacting of liquids with granular solids and discharging said solids into a gaseous atmosphere, which comprises: maintaining the downwardly extending column of the liquid below the contacting zone; allowing the granular solids from the lower section of the contacting zone to settle through said liquid column; providing a plurality of confined withdrawal compartments beneath said column; causing each of said withdrawal compartments to be operated on a cycle comprising, filling the compartment with a suitable flush liquid while out of communication with said column and thereby forcing gases from said compartment, opening the compartment to said column to allow granular solids to settle into the compartment from the column, closing off communication between the compartment and the column, discharging liquids and granular solids from the withdrawal compartment into a gaseous atmosphere so that gas enters said compartment and refilling the compartment with flush liquid to a level such that when the granular solids settle into the compartment there will be a slight upflow of displaced flush liquid through the column; controlling the cycles for all of said withdrawal compartments so that at least one compartment is always in communication with said column, and controlling the rate of opening and closing communication between withdrawal compartments and column to control the rate of granular solids removal from the column.

9. The method of claim 8, with the added limitation that the compartment, when filled with flush liquid, is filled to a level such that when opened to the column there will be a slight down-flow of liquid from the column into the compartment rather than liquid flowing up from compartments into column.

References Cited in the file of this patent

UNITED STATES PATENTS

| | | |
|---|---|---|
| 748,414 | Passburg | Dec. 29, 1903 |
| 941,024 | Mantius | Nov. 23, 1909 |
| 1,327,540 | Fooks | Jan. 6, 1920 |
| 1,522,480 | Allen | Jan. 13, 1925 |
| 2,020,342 | Thompson | Nov. 12, 1935 |
| 2,139,943 | Fenske et al. | Dec. 13, 1938 |
| 2,180,849 | Printz | Nov. 21, 1939 |
| 2,246,654 | Arveson | June 24, 1941 |
| 2,274,003 | Sheppard | Feb. 24, 1942 |
| 2,459,180 | Richter | Jan. 18, 1949 |
| 2,470,339 | Claussen et al. | May 17, 1949 |
| 2,552,435 | Knox et al. | May 8, 1951 |
| 2,631,727 | Cichelli | Mar. 17, 1953 |
| 2,701,786 | Evans et al. | Feb. 8, 1955 |
| 2,709,652 | Plunguian | May 31, 1955 |

FOREIGN PATENTS

| | | |
|---|---|---|
| 404,507 | Germany | Nov. 5, 1934 |